F. C. HAMILTON.
MOTION PICTURE APPARATUS.
APPLICATION FILED JAN. 21, 1916.
1,244,728.
Patented Oct. 30, 1917.
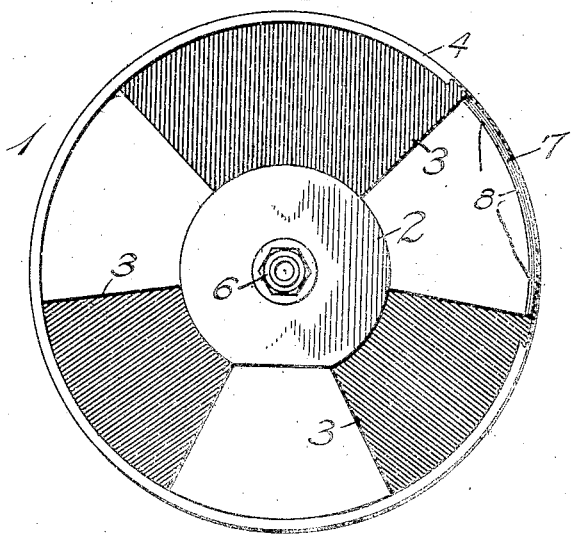
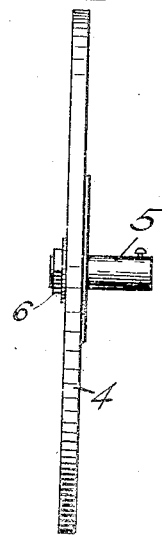
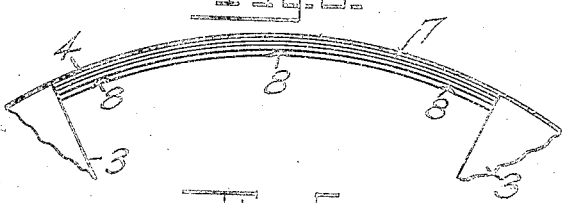
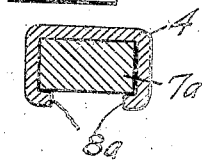
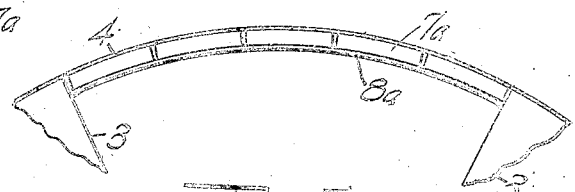
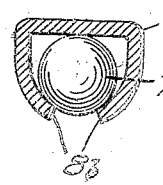
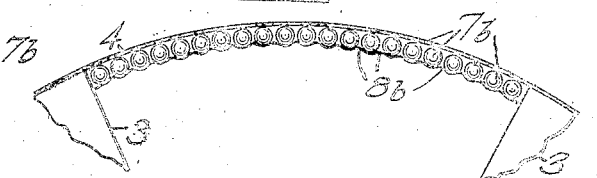
Inventor
Frank C Hamilton
By his Attorney

UNITED STATES PATENT OFFICE.

FRANK C. HAMILTON, OF NEW YORK, N. Y., ASSIGNOR TO EUREKA PROJECTOR DEVICE CO., INC., OF NEW YORK, N. Y., A CORPORATION OF NEW YORK.

MOTION-PICTURE APPARATUS.

1,244,728.  Specification of Letters Patent.  Patented Oct. 30, 1917.

Application filed January 21, 1916. Serial No. 73,273.

*To all whom it may concern:*

Be it known that I, FRANK C. HAMILTON, a citizen of the United States, residing at New York, in the county of New York and State of New York, have invented certain new and useful Improvements in Motion-Picture Apparatus, of which the following is a specification.

The object of my invention is to provide means whereby the shutter of a moving picture machine having two or more sectors may be made to balance perfectly without changing the construction of the said shutter. This will eliminate the uneven rotation and vibration present in shutters not provided with my improvement, caused by the unequal weight of the sectors of the shutter.

Another object of my invention is to provide means whereby the sectors of a shutter are held in their predetermined position, and prevented from coming loose, which is an objectionable feature in that type of shutter in which the sectors are not a part of the carrier and rim.

My invention includes balancing weight units which are held in or by the rim of a moving picture shutter between the sectors of the said shutter, wherever they may be required to cause the shutter to balance perfectly. These units in one form of the device, also act as braces between sectors, to maintain them in proper spaced relation.

In the accompanying drawings, which are to be taken as a part of this specification, and in which I have shown a merely preferred form of embodiment of the invention, Figure 1 is a front view of a moving picture shutter with part of the rim broken away; Fig. 2 is a side elevation of the shutter shown in Fig. 1; Fig. 3 is an enlarged view of part of the rim of the shutter shown in Fig. 1; Fig. 4 is a detail view of one of the weight members; Figs. 5, 6, 7 and 8 show modified forms of construction.

Referring to the numerals on the drawings, 1 indicates a moving picture shutter having a carrier 2, sectors 3, 3, 3, a rim 4 U-shaped in cross section, and a shank or bushing 5, which is locked to the carrier 2 by means of a nut 6. The shank or bushing 5 is attached to the shaft of a moving picture machine, which causes the shutter to rotate at the proper speed. Balancing weight members 7 in the rim 4, in the form of strips or bars, properly shaped (Fig. 3), are held in the proper positions and quantities in rim 4, so as to cause the shutter to balance perfectly. These weight members also act as braces between the sectors 3—3, extending as they do from sector to sector. They are held in position by crimping the under side of the rim 4, as indicated at 8.

The modified arrangement shown in Figs. 5 and 6 includes weight members $7^a$, in the form of blocks, held in the rim 4 by crimping the under edges of the said rim as at $8^a$ (Fig. 6).

The modification shown in Figs. 7 and 8 includes weight members $7^b$ in the form of balls held in rim 4 by crimping the under side of said rim as at $8^b$ (Fig. 8) so as to hold the balls $7^b$ at any predetermined point of the rim.

In all of the above forms the number and position of the weight members are determined by the balance of the shutter. A balancing weight is put into position and secured wherever required. And besides arranging for the distribution of weights along the length of the rim, I contemplate the positioning of weights toward and from the center of rotation. Thus in Fig. 3 laminæ or strips 7 successively placed in the rim will increase the proportion of weight toward the center. Similarly the blocks $7^a$ may be in laminated sections, instead of solid.

The above is a description of the preferred form of my invention, but it will readily be seen that many changes and modifications may be made without departing from the scope of the invention.

I claim:

1. In a shutter for moving picture machines, a carrier, a plurality of sectors radially mounted on said carrier, a rim U- shaped in cross section around the outer edge of said sectors, and a weight strip held in said rim between said sectors for bracing the same.

2. In a shutter for moving picture machines, a carrier, a plurality of sectors radially mounted on said carrier, a rim U-shaped in cross section around the outer edge of said sectors, and a plurality of weight members held in said rim between adjacent sectors for bracing the same.

In testimony whereof I affix my signature.

FRANK C. HAMILTON.